United States Patent Office 3,460,910
Patented Aug. 12, 1969

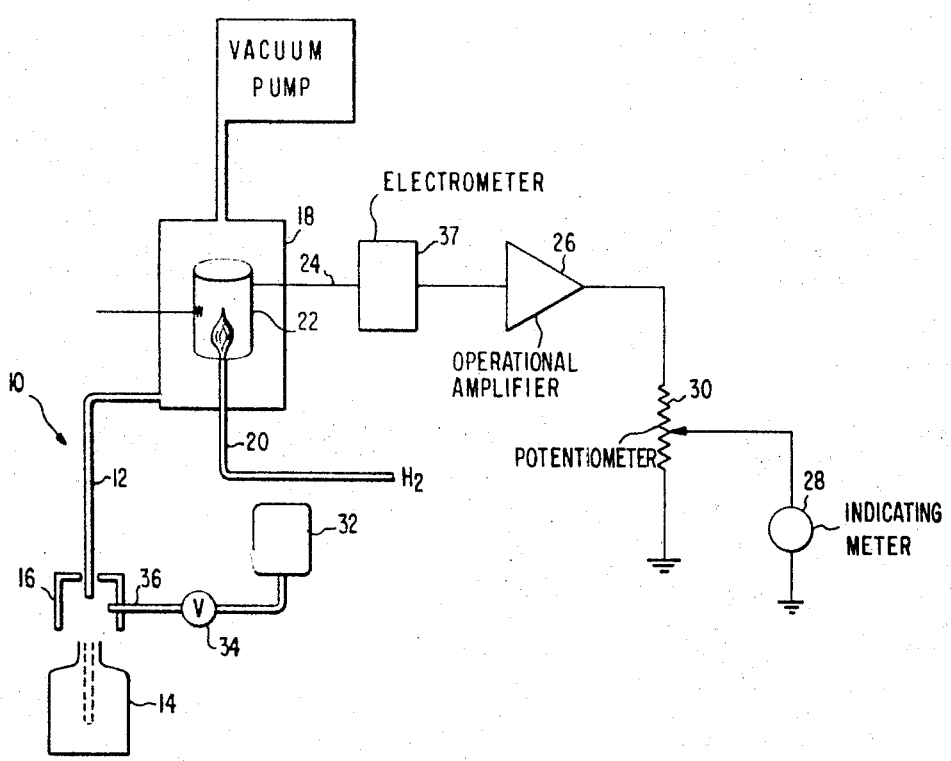

3,460,910
SENSITIVITY CONTROL FOR GASEOUS ORGANIC CONTAMINATION DETECTOR
Karl H. Emich, Decatur, Ill., assignor to National Distillers & Chemical Corporation, New York, N.Y., a corporation of Virginia
Filed July 25, 1966, Ser. No. 567,575
Int. Cl. G01n 27/62, 27/02
U.S. Cl. 23—254                      4 Claims

ABSTRACT OF THE DISCLOSURE

A sensitivity control for a flame ionization gaseous organic contaminant detector wherein a standard gas can be admitted to the detection cell to permit adjustment of the indicating meter reading to the standard by means of a potentiometer in the circuit between the detector and the indicating meter.

---

This invention relates to improvements in the art of gas or vapor organic contamination detectors and particularly to a simple and unique sensitivity control therefor.

Organic gas contaminant detector units of the type utilizing a sample withdrawn from the interior of an open end container passed to a flame ionization detector cell are known as shown in Patent 3,266,292 (Ser. No. 373,310, filed June 8, 1964) assigned to the assignee of this invention.

In order to vary the sensitivity of the contaminant detector, for example to allow an operator to set the response to the contamination detector with regard to a fixed sample, it has been known in the past to change the ratio of the sample and the flame producing gas. This, however, is impractical because the most desirable arrangement is to have fixed values without adjustment and even if adjustments are built in to control the sample/flame producing gas ratio, this requires elaborate checking of the adjustment which is not easy or desirable.

The necessity for adjusting the output of the detector cell is in order to have it produce the required output for a standard sample gas and further in case there are multiple detector units so that one can be adjusted to read the same as another in the same plant. In other words, with adjustment means all contamination detectors can be easily adjusted to have the same response. Further, if the sensitivity should change during long periods of operation, they can be checked and brought back into adjustment.

Other features of the invention will be pointed out in the following description and claims and illustrated in the accompanying drawing, which disclose by way of example, the principle of the invention and the best mode which has been contemplated of applying that principle.

In the drawing:

The single figure of drawing is a simplified schematic presentation and electrical circuit illustrating the sensitivity control of this invention.

A detection unit 10 such as shown in aforesaid Patent 3,266,292 includes a sampling probe 12 which is alternately extended to within the open end of container 14 and withdraw to a position adjacent a shroud 16. Gas is continuously drawn through the lower end of the probe 12 by a vacuum pump to draw the sample through flame ionization detection cell 18 which may be of the type described in the aforesaid patent.

In the flame ionization detection cell the sample is burned in a flame of hydrogen supplied through inlet 20 and collector electrode 22 is electrically connected at 24 to an electrometer 37 and an operational amplifier 26. The output of the amplifier is fed to an indicating meter 28 which may be a millivolt meter as described in the aforesaid patent.

In order to adjust the sensitivity of the output there is a potentiometer 30 which may have a knob or screwdriver adjustment to vary the signal input to the indicating meter. With this simple and inexpensive arrangement the sensitivity as will be read by the indicating meter 28 may be varied. In order to check the contaminant detector against a standard, a sample standard gas 32 may be supplied under the control of valve 34 through line 36 to the shroud 16 and the potentiometer 30 adjusted until the output of the indicating meter is as required.

In addition, the sensitivity may vary over long periods of use at which time it can continually be rechecked.

A further point where adjustment is desirable is where there are a number of units on line and it is desired to adjust all the units in a single installation to a standard sensitivity. This arrangement allows this to be accomplished.

While the invention has been particularly shown and described with reference to a preferred embodiment thereof, it will be understood by those skilled in the art that various changes in form and details may be made therein without departing from the spirit and scope of the invention.

I claim:

1. A sensitivity control for a gaseous organic contaminant detector of the flame ionization type wherein a change in the presence of organic contaminants results in a change in ionization which is represented by an electrical output which in turn is electrically connected to an indicating meter through an amplifier, the improvements comprising; a variable impedance in the circuit between the detector and the indicating meter to allow variable adjustment of the signal from the cell to the indicating meter to adjust the indicating meter output and means to supply a standard gas to the detection cell to allow adjustment of the indicating meter reading to the standard.

2. A sensitivity control as defined in claim 1 wherein the variable impedance is connected between the amplifier output and indicating meter input.

3. A sensitivity control as defined in claim 2 wherein the variable impedance is a potentiometer.

4. A sensitivity control as defined in claim 1 wherein said means includes a valve for controlling the introduction of said standard gas to said detection cell.

References Cited

UNITED STATES PATENTS 3,169,832   2/1965   Gallaway et al.
3,366,456   1/1968   Andreatch et al.

MORRIS O. WOLK, Primary Examiner

R. E. SERWIN, Assistant Examiner

U.S. Cl. X.R.

23—232